US006595859B2

(12) United States Patent
Lynn

(10) Patent No.: US 6,595,859 B2
(45) Date of Patent: Jul. 22, 2003

(54) INTERNET MARKETING METHOD AND GAME

(75) Inventor: Scott W. Lynn, Shawnee, KS (US)

(73) Assignee: Virtumundo, Inc., Kansas City, MO (US)

(*) Notice: Subject to any disclaimer, the term of this patent is extended or adjusted under 35 U.S.C. 154(b) by 0 days.

(21) Appl. No.: 09/295,953

(22) Filed: Apr. 21, 1999

(65) Prior Publication Data

US 2003/0003975 A1 Jan. 2, 2003

(51) Int. Cl.⁷ .................................................. A63F 9/24
(52) U.S. Cl. ......................................... 463/42; 705/14
(58) Field of Search ..................... 463/1, 25, 29–30, 463/40–42, 16, 11; 340/825, 323 R; 705/1, 14, 26–27; 902/1, 2; 434/118

(56) References Cited

U.S. PATENT DOCUMENTS

| | | | |
|---|---|---|---|
| 4,902,020 A | * | 2/1990 | Auxier |
| 5,009,429 A | * | 4/1991 | Auxier |
| 5,192,076 A | * | 3/1993 | Komori |
| 5,347,632 A | * | 9/1994 | Filepp et al. |
| 5,643,088 A | * | 7/1997 | Vaughn et al. |
| 5,791,991 A | * | 8/1998 | Small |
| 5,816,918 A | * | 10/1998 | Kelly ........................... 463/16 |
| 5,823,879 A | * | 10/1998 | Goldberg et al. ............. 463/42 |
| 5,855,514 A | * | 1/1999 | Kamille |
| 6,036,601 A | * | 3/2000 | Heckel ......................... 463/42 |
| 6,048,268 A | * | 4/2000 | Humble ........................ 463/16 |
| 6,076,104 A | * | 6/2000 | McCue |
| 6,186,893 B1 | * | 2/2001 | Walker ......................... 463/16 |

FOREIGN PATENT DOCUMENTS

GB    2147773    *    5/1985

OTHER PUBLICATIONS

MacWorld, Reviews, pp. 167, 168, 170 and 172, Apr. 1990.*
Real Time Media, Inc., web pages of Prizes dot com showing advertising with game, 10 pages, Jan. 1999.*
Instant Scratch Screen Game by RealTime Media on web pages of Prizes dot com, 18 pages, 1995.*

* cited by examiner

Primary Examiner—Mark Sager
(74) Attorney, Agent, or Firm—Holland & Hart

(57) ABSTRACT

An Internet marketing method and game is designed for promoting access to the web site which hosts the game, and to keep potential consumers occupied on the web site for exposure to several different advertisements, or to a few advertisements repeatedly. The inventive game is centered around a "point and click" system in which a screen display is provided which includes a game image made up of a large number of individual pixels. A player is encouraged to randomly select a pixel or image area location on the game image which selected pixel or image area location is then compared to one or more stored prize winning pixel or image area locations. Players are encouraged to play the game as many times as they like, and with each play, one or more advertisements are displayed on the screen outside of the picture, and on losing response pages with each additional "play" of the game.

17 Claims, 8 Drawing Sheets

INTERNET MARKETING METHOD AND GAME

BACKGROUND OF THE INVENTION

I. Field of the Invention

The present invention relates to an Internet marketing method and game, and, more particularly, to such a marketing method in which a game is designed to attract visitors to a web site and to retain their attention while a variety of ads are displayed.

II. Description of the Related Art

Marketing of products and services via the Internet has exploded in recent years. Just as in standard marketing, it is a constant challenge to get potential customers to visit or "hit" on a marketer's web site. There are literally millions of Internet/World Wide Web sites which are accessible by users of the Internet. A problem with using such Web Sites as a marketing tool is the huge number of options available to a user. In other words, without some incentive or direction for a user to access a particular company's web site, there is little likelihood that a particular user will access that web site, or even be aware of its existence.

Many different creative methods of encouraging customers to access marketing web sites have been developed primary among which is the use of "banner ads" or other advertising space and images which are displayed on search engines, etc. A problem with such banner ads is the limited time exposure to a potential customer presented by a search engine or other general interest web site.

It is apparent that a new marketing strategy and method is needed to take advantage of the Internet to provide a more reliable exposure of potential customers to a marketer's advertisements. Such a marketing strategy should encourage a maximum number of individuals to come to the web site featuring the advertisements, and to remain there for a time sufficient to view all of the available advertisements, and/or to repeatedly view particular ones of the advertisements.

SUMMARY OF THE INVENTION

The present invention is an Internet marketing game designed for promoting access to the web site which hosts the game, and to keep potential consumers occupied on the web site for exposure to several different advertising spaces, or to a few such advertising spaces repeatedly. The advertising spaces can be the property of the promoter of the game web site, or, alternatively, some or all of the space can be sold to other web site marketers.

The inventive game is centered around a "point and click" system in which a screen display is provided which includes an image made up of a large number of individual pixels. A player is encouraged to move a cursor, by mouse or the like, around the image and to randomly select a pixel or image area on the image by clicking on the mouse button. The x-y coordinate location of the pixel or image area is then compared against stored x-y coordinates for winning pixel or image area location(s). If the location of the selected pixel or image area matches the pixel or image area location randomly selected and stored, then the player wins a prize. Players are encouraged to play the game as many times as they like, and with each play, one or more advertisements are displayed on the screen outside of the picture. Of course, with a large number of pixels on a typical image, selection of a particular winning pixel or image area location at random is an extremely small probability. In the example given herein as a preferred embodiment, the game is called THE TREELOOT GAME[SM] and the image is of a "money tree", i.e. a tree supporting thousands of dollar bills.

OBJECTS AND ADVANTAGES OF THE INVENTION

The principle objects and advantages of the invention include: to provide an Internet marketing method and game; to provide such a marketing method and game which encourages potential customers to visit the web sites of game sponsors; to provide such a marketing method and game in order to build an Internet audience; to provide such a marketing method and game in which a game image is displayed to a player along with advertisements for game sponsors; to provide such a marketing method and game in which a player is prompted to select an image area on the game image by "pointing and clicking" thereon; to provide such a marketing method and game in which one or more winning image areas are stored in memory to be compared against the image areas selected by a player to determine if a winning "match" has been made; to provide such a marketing method and game in which a player is encouraged to repeatedly play the game, thus repeatedly exposing the player to advertisements of game sponsors; to provide such a marketing method and game in which each losing game round results in a losing response page being displayed to the player, which response page also includes at least one game sponsor ad; to provide such a marketing method and game which effectively exposes multiple potential customers to a sponsor's ad for extended periods; to provide such a marketing method and game which generates advertising revenue; to provide such a marketing method and game which can act as a cross-promotion for other web sites and/or games; and to provide such a marketing method and game which is particularly effective for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in any desired manner.

Figure 1A:
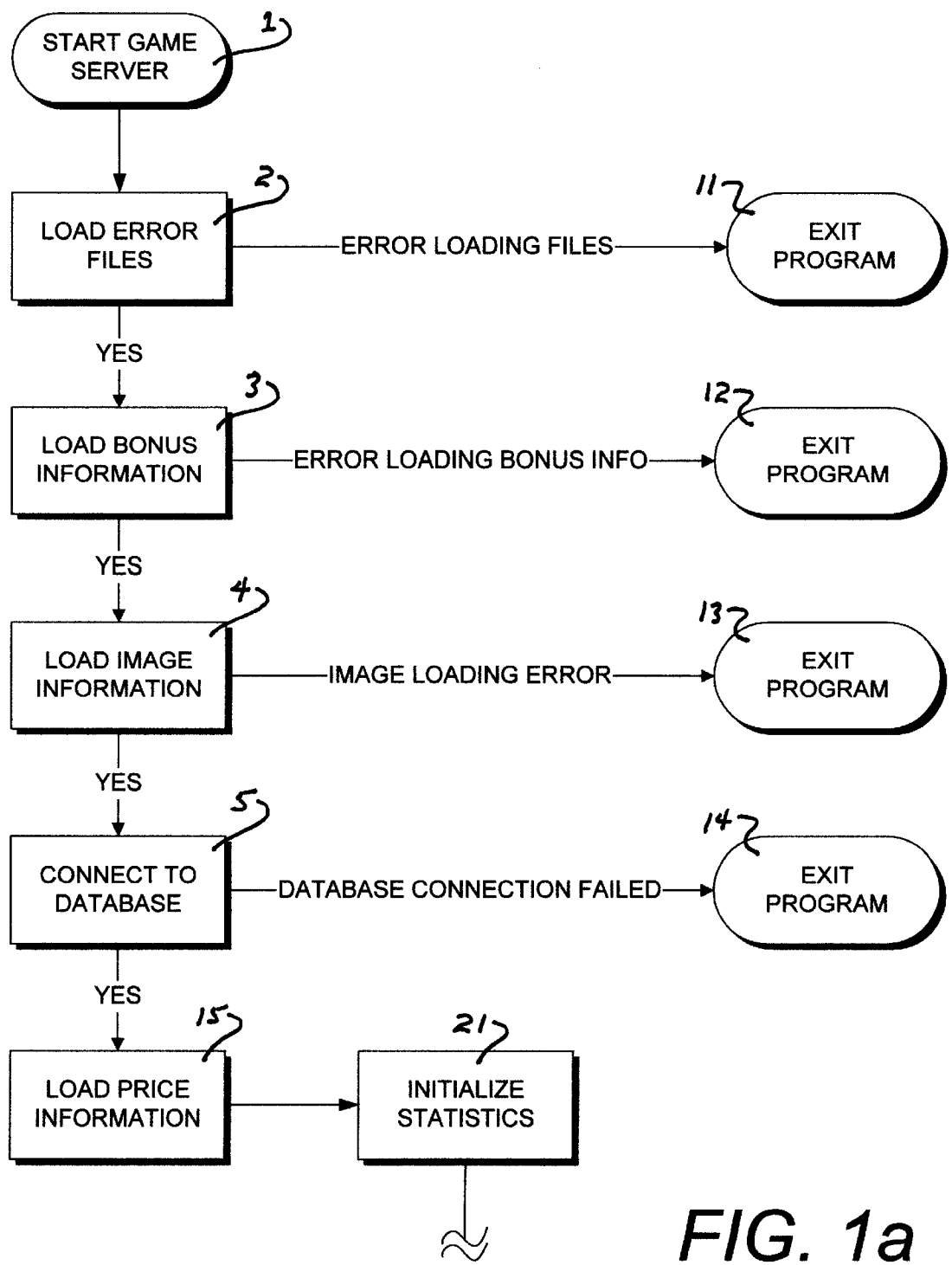
FIGS. 1a and 1b, collectively, are a schematic block diagram representing the Internet Marketing Game according to the present invention.
Figure 1B:
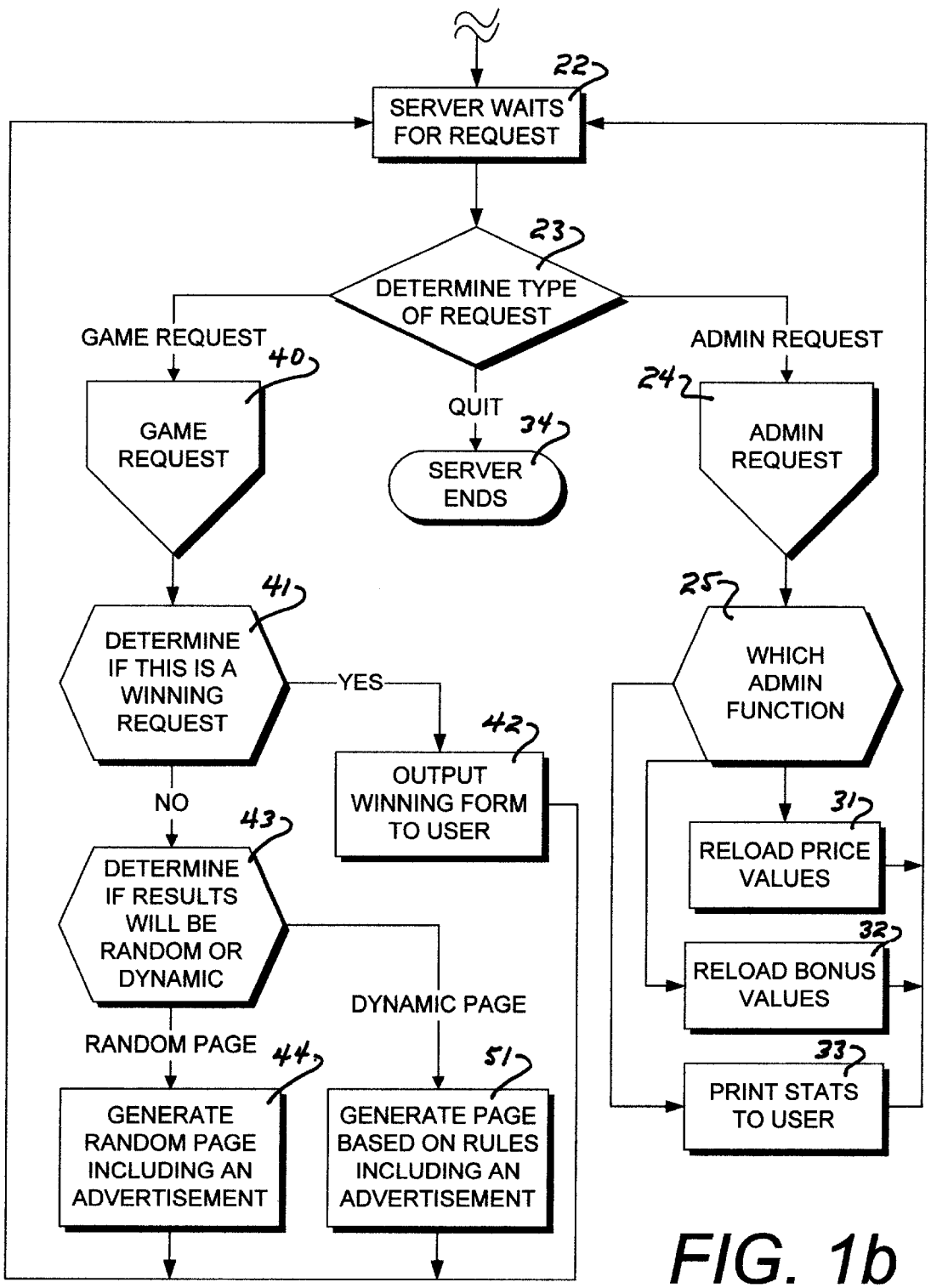

Referring to FIGS. 1a and 1b, a block schematic diagram represents the logic of the inventive Internet Marketing Game. At block 1, the game server is started and block 2 represents the loading of error files. This is an HTML file read into memory which the server is programmed to output in the event of a fatal error. Block 3 represents the loading of bonus information for that particular period, such as, e.g. a 24 hour period. This information includes parameters for bonus and "secret bonus" rounds, with each such parameters being read from the file and parsed into its particular internal representation. Block 4 represents the loading of image information for the particular image being used for the game. The rules of the game dictate that only pixel or image areas selected within the image boundaries can be winning locations, e.g. the tree foliage, the trunk or surrounding grass in the case of a "money tree". This step involves the loading of image "mask" files which define the image areas for a later generation of bonus round prize locations on the image.

At block 5, the server connects to a database just this once, upon start-up. In the event that an error is detected in the loading of any of this information, or the connection to the database, the program is automatically exited, as indicated by blocks 11–14.

At block 15, the price information for prizes being awarded during the particular period is loaded. This step includes the loading of prize status information as well as the pixel or image area coordinate locations of the prizes available for the game. This information is read in and parsed to individual memory locations. At block 21, the statistical data is initialized for the game for that period. The game server maintains a variety of internal statistics about the game and the web site, including, without limitation, number of requests handled time spent handling requests, etc. and this step indicates the initialization of these statistics.

At block 22, the game server waits for a request by a customer accessing the web site. The game server is a standard TCP/IP protocol server, performing in the outermost request loop in the standard TCP/IP. The server performs the standard HTTP server steps of creating a TCP server socket, waiting for requests to come into that socket, decoding those requests, and dispatching the appropriate routines to handle the request. This block indicates the waiting step of that server process. At block 23, the server determines whether the request is administrative in nature, or is a game request. This is the decoding and dispatching steps of the server process. Decoding of the request is performed by examining the target of the FET HTTP command and for examining any HTTP "cookie" present in the request. The server divides the requests into three general categories, namely Exit requests, which can only come from an administrator; Administrative Requests, which can also only come from a system administrator; and Game Requests, which come from a player. Game Requests are generated by a player's HTTP browser in communication with the Game Server, and include the pixel or image area location of a player pointing and clicking on the image in playing the game.

If the request is administrative, as indicated at block 24, the server determines what type of administrative function is being requested, at block 25. Three examples are illustrated, including block 31, reloading price values, block 32, reloading bonus values, and block 33, printing statistics to the user. Once the selected administrative function is performed, the server again waits for a further request.

Another administrative function is represented by block 34, where the game server can be selectively shut down by an authorized administrator.

Conversely, if the request is a game request, as indicated at block 40, in the form of a code including a selected (x,y) pixel or image area coordinate location on the tree, the specific game situation for which the request was generated, i.e. main round, bonus round, etc., and a verification that the request was originated by a "click" on the game image from the player's browser (as opposed, e.g., to being typed in manually). At block 41, the selected pixel or image area location is compared against the winning pixel or image area locations for the prize list for that time period in order to determine whether the selection is a winner. If the selected pixel or image area location matches the winning location, at block 42, a winner's form (an HTML form that the winner must fill out and submit) is output to the player and the server is returned to the request waiting status of block 22.

If the selected pixel or image area location does not match the winning pixel or image area location, at block 43, the server determines whether a random response page or a rules based dynamic response page will be generated. This is determined by a complex set of rules which determine how exactly to respond to the unsuccessful player. For example, the second displayed losing response page will ask for an identifier in the form of an alphanumeric character string. If the player does not enter any such identifier, then he is assigned a simple identifier such as "friend" for future dynamic response pages. Dynamic response pages which are customized to that player's identifier depending upon the player's selected pixel or image area location, time of day, the number of times a player has accessed a banner ad link, the number of consecutive "plays" by that player, etc. For example, as the player's selections get closer to a winning location, the dynamically generated response page might be something like "Friend, you are getting warmer". Of the two broad response types, the random pages are static, prewritten "pages" (files with text and HTML markup codes) which are randomly chosen from a large number of such pages. The dynamic pages are generated by special purpose routines in the server so that they can be customized to the particular player and game situation. Each player is tracked by a unique "cookie", i.e. a unique identifier sent from server to the player's browser when the player initially accesses the game web site. The player's cookie is then used for purposes of generating the dynamic response pages.

Based upon this decision, either, at block 44, a random losing response page is selected from storage and displayed, with a message which attempts to get the player to play again, in addition to displaying one or more advertisements; or, at block 51, a dynamic, personalized losing response page is generated and displayed, also with an invitation to play the game again, along with displaying one or more advertisements. In either scenario, after providing the response page, the server is then returned to the request waiting status of block 22.

Figure 2:
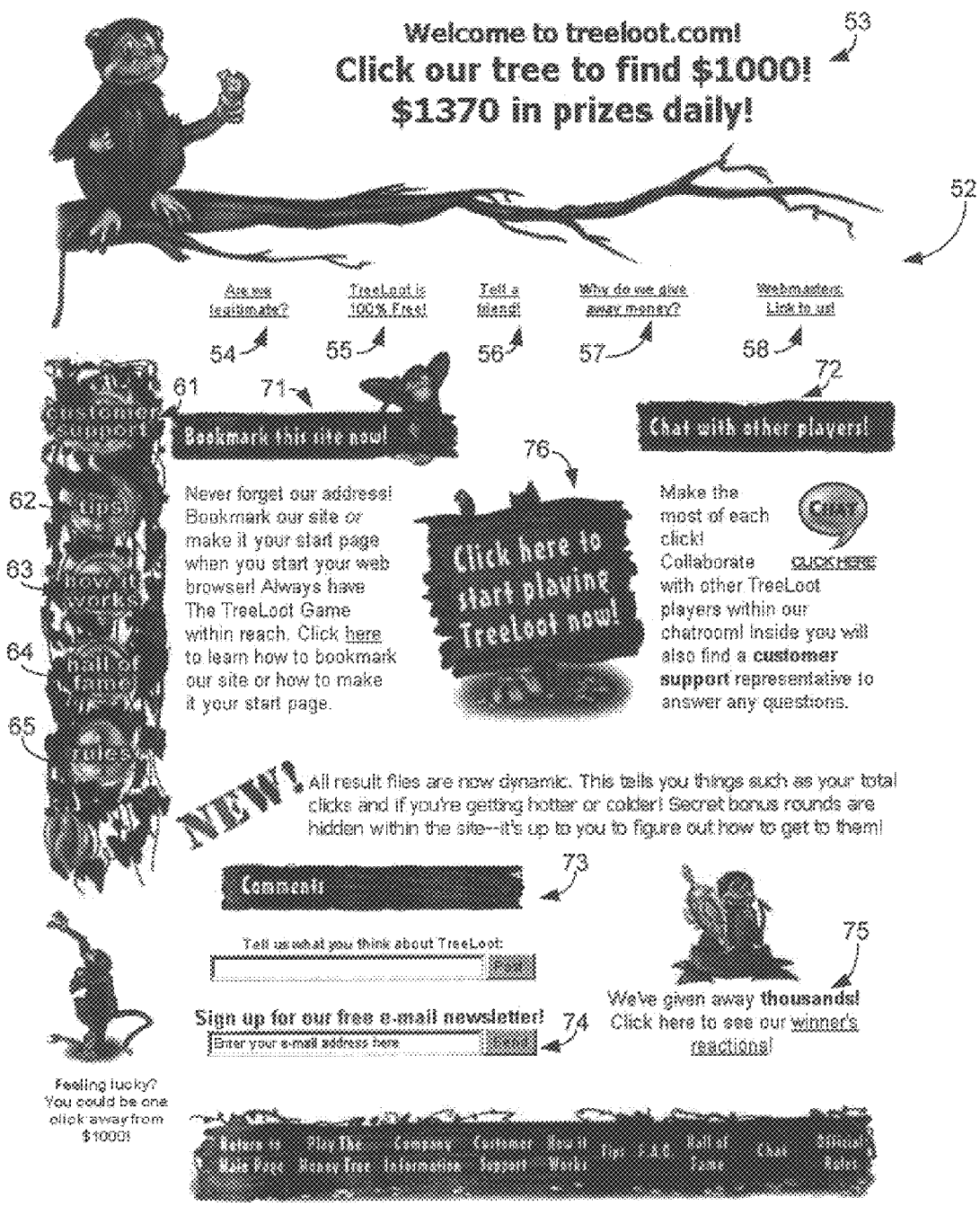
FIG. 2 is a representative screen display illustrating the web site for the inventive Internet Marketing Game.

FIG. 2 illustrates a representative web site for the inventive Internet marketing game, generally indicated at 52. The web page 52 includes a welcome banner 53 exclaiming the prizes available, as well as a plurality of alternative buttons, including "Are we legitimate?" at 54; "TreeLoot is 100%

Free!" at 55; "Tell a friend!" at 56; "Why do we give away money?" at 57. In addition, on the left side of the page, a series of other administrative selection areas are located, including "customer support" at 61; "tips" at 62; "how it works" at 63; "hall of fame" at 64; and "rules" at 65. Other selectable regions of the web page 52 include "Bookmark this site now!" at 71, which includes instructions on making the site a start page; "Chat with other players" at 72; a "Comments" option at 73; an e-mail sign-up option at 74; and a "winner's reactions" option at 75. Of course, many other administrative functions can be displayed here as well, including color and display customization options, etc. Approximately centered on the web page 52 is a game selection area 76 which allows a player to access the game page, as explained below.

Figure 3:
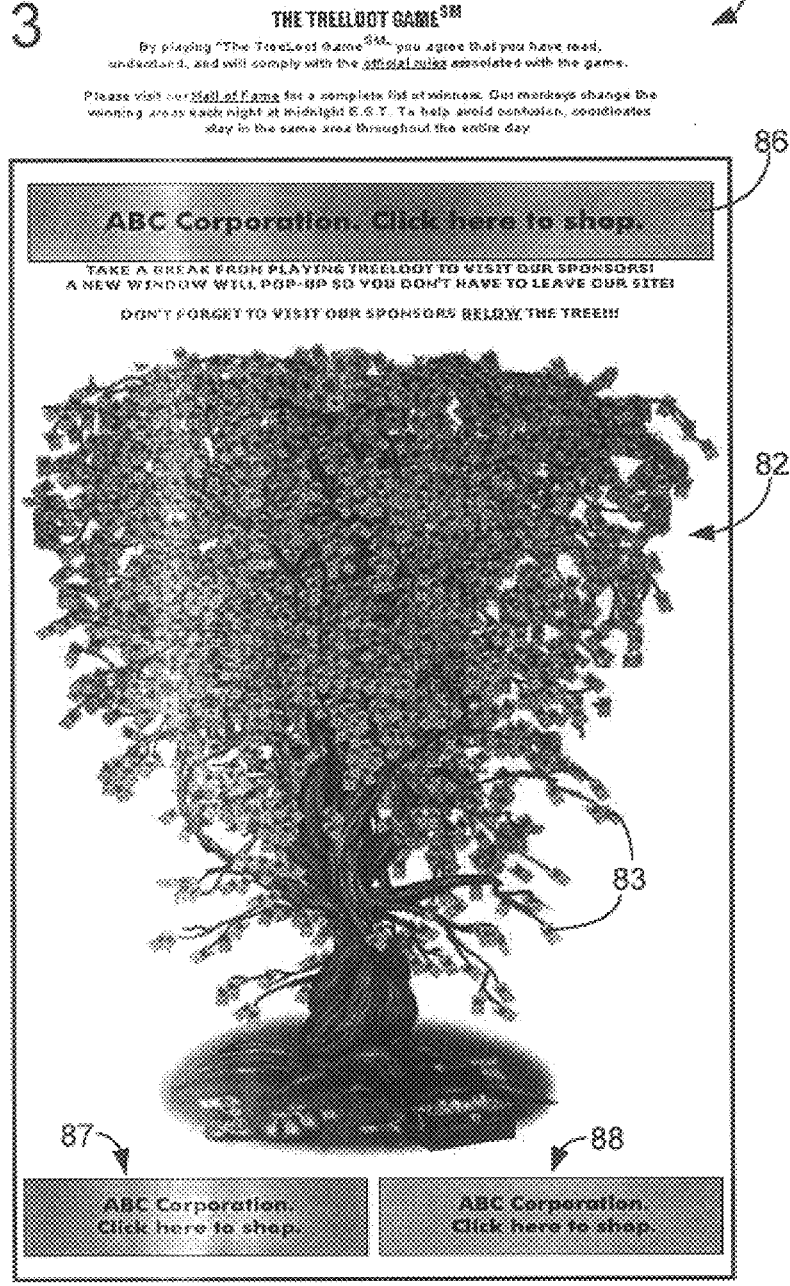
FIG. 3 is a representative screen display illustrating an example of a "Money Tree" image from which a pixel or image area is selected by a player in playing the inventive Internet Marketing Game.

FIG. 3 illustrates a representative game page, generally indicated at 81. The game page 81 includes a large image of a "money tree" 82 with a large number of images of dollar bills 83 on the tree. In addition, a banner 84 inviting the player to "play as many times as you like for free!" is provided at the top of the page, along with an instruction banner 85. Immediately above the money tree image 82 is a banner ad 86, which can be constant during any one game selection, or can be alternated with other advertisements. Other advertisements 87, 88 can be located on the game page 81 as well, as illustrated. Of course, each banner ad 86, etc. is designed to catch the eye of a player, and each has a message 91 which reminds the player that they do not need to leave the game site to access the sponsor's web page.

Figure 4:
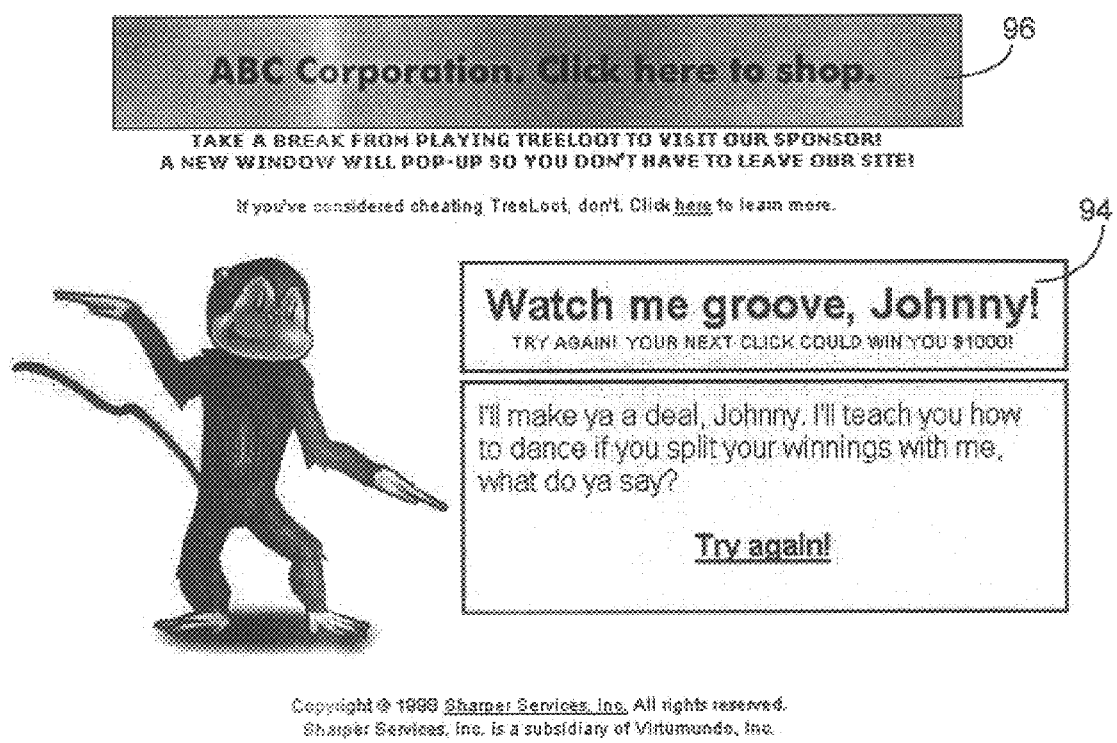
FIGS. 4 and 5 are alternative randomly selected losing response pages.
Figure 5:

FIGS. 4 and 5 are alternative random response pages to a losing game attempt, with various messages 94, 95 designed to entice the player to play again, and/or to visit the sponsoring advertisements 96, 97, respectively.

Figure 6:
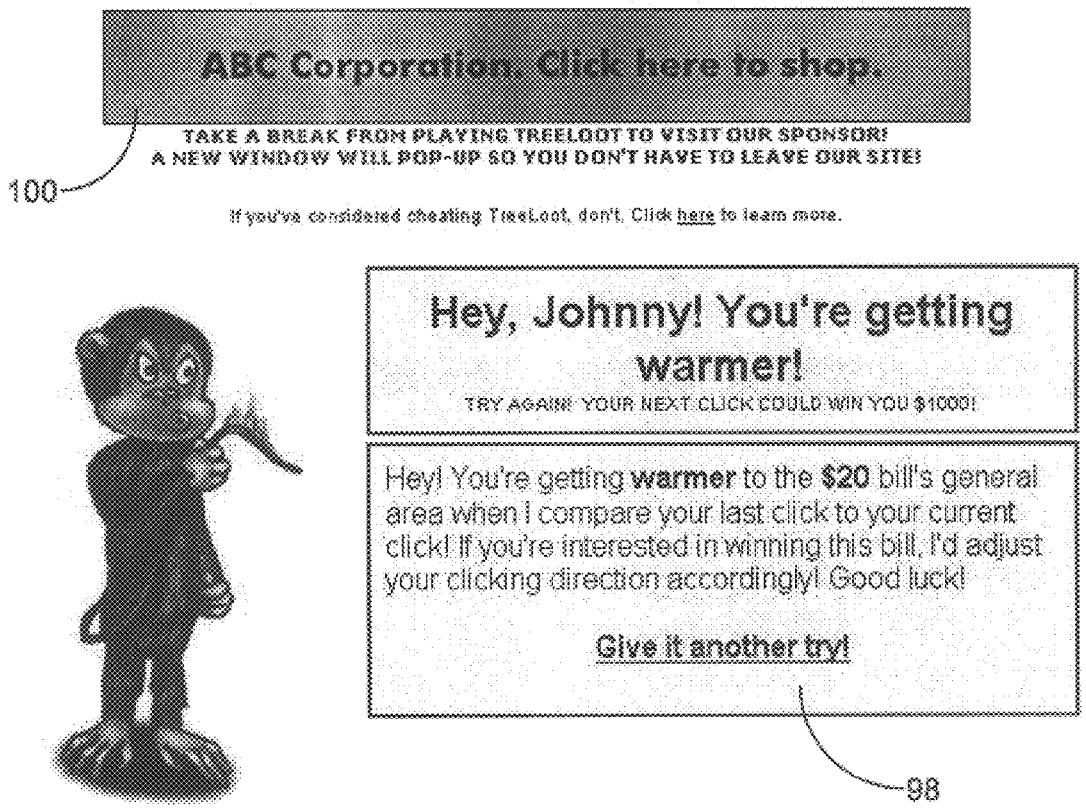
FIGS. 6 and 7 are two different dynamically generated losing response pages which are customized to the particular player and game situation.
Figure 7:
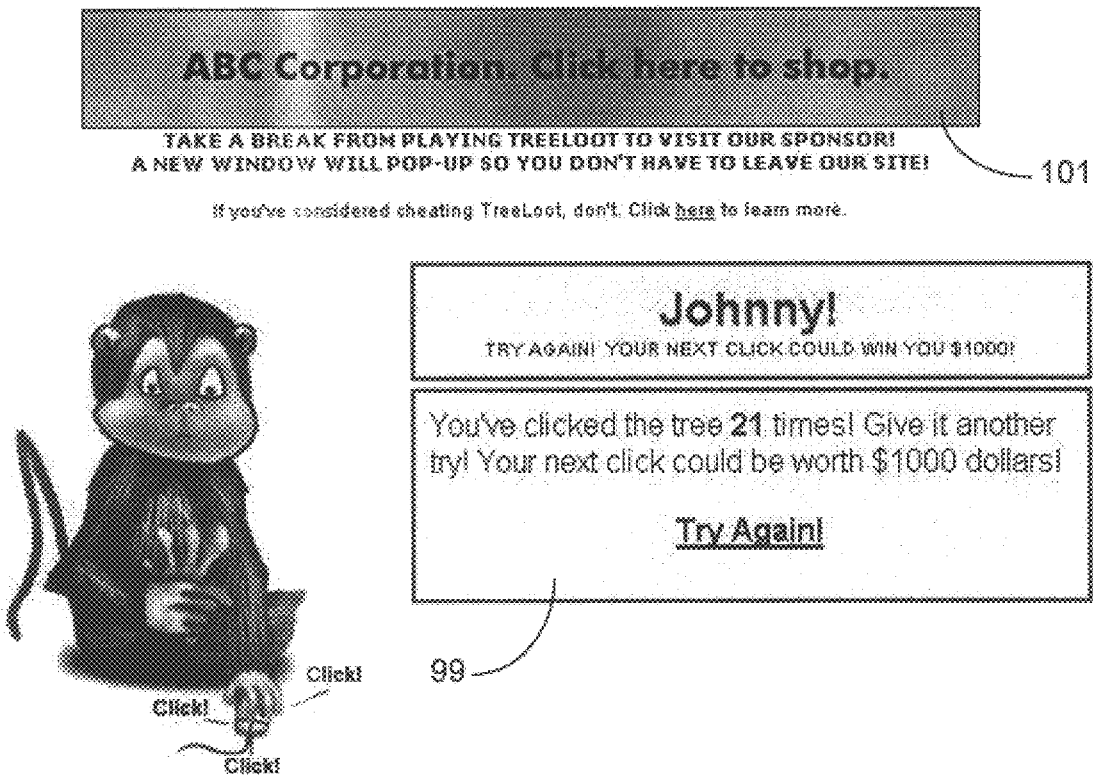

FIGS. 6 and 7 are examples of dynamic response pages generated specifically for that player based upon one or more of a number of factors. For example, FIG. 6 includes a message 98 informing the player of the number of times they have played the game thus far. FIG. 7 includes a message 99 generated in response to the player "clicking" on a pixel or image area which is reasonably close to a predetermined winning pixel or image area location for a $20 prize. In both FIGS. 6 and 7, as in FIGS. 4 and 5, sponsor's advertisements 100 and 101, respectively, are displayed as well.

While the game image has been illustrated as a money tree, it should be made clear that the game image could be virtually any image occupying a large number of pixels, e.g. a giant image of a dollar bill, a diamond mine, etc. The game image could also be changed with each successive play, or with each time the player plays a predetermined number of successive plays. The terms HTML, TCP/IP and other specific languages and protocols, etc. used herein, are exemplary only, and should not be considered as limiting. Many other changes will be apparent to one of skill in the art without departing from the spirit of the invention. It is to be understood that while certain forms of the present invention have been illustrated and described herein, it is not to be limited to the specific forms or arrangement of parts described and shown.

What is claimed and desired to be secured by Letters Patent is as follows:

1. A computer network marketing method, comprising:
   providing a computer network;
   providing a screen display accessible via the computer network, the screen display comprising an image made up of a plurality of pixels;
   providing an advertisement viewable on the screen display;
   providing a winning image area location within the plurality of pixels;
   allowing a user of the network to select randomly an image area location;
   comparing the randomly selected image area location with the winning image area location to determine if they match;
   rewarding the user if the image area location matches the winning image area location;
   determining whether a random response page or a rules based dynamic response page will be generated if the image area location does not match the winning image area location;
   encouraging the users to remain at the screen display, and thus remain exposed to the advertisement for extended periods, by inviting the users to select another random image location.

2. The method of claim 1 wherein the image comprises thousands of individually selectable image area locations.

3. The method of claim 1 where a point-and-click method is used to select randomly the image area location.

4. The method of claim 1 wherein a plurality of advertisements are displayed on the screen display.

5. The method of claim 1 wherein different advertisements are displayed on the screen display depending on whether a match results from the randomly selected image area location.

6. The method of claim 1 wherein the winning image area location changes periodically so that the user does not know where the winning image area is located on the image.

7. A method according to claim 1, further comprising:
   a set of rules to determine whether a random response page or a rules based dynamic response page will be generated if the randomly selected image area location does not match the winning image area location.

8. The method of claim 1, further comprising;
   requesting the user to provide an identifier;
   customizing a dynamic response page to the identifier of the user.

9. The method of claim 1, further comprising:
   providing the user with a winner's form to fill out and submit upon determining that the image area location matches the winning image area location.

10. The method of claim 1, further comprising:
    providing a set of rules to determine whether a random response page or a rules based dynamic response page will be generated if the randomly selected image area location does not match the winning image area location;
    generating a dynamic response page customized to the user.

11. The method of claim 1, further comprising:
    providing a set of rules to determine whether a random response page or a rules based dynamic response page will be generated if the randomly selected image area location does not match the winning image area location;
    generating a dynamic response page customized to a game situation.

12. A computer network marketing methods, comprising:
    providing a computer network;
    providing a screen display accessible via the computer network, the screen display comprising an image made up of a plurality of pixels;

providing an advertisement viewable on the screen display;

providing a winning image area location within the plurality of pixels;

allowing a user of the network to select randomly an image area location;

comparing the randomly selected image area location with the wining image area location to determine if they match;

rewarding the user if the image area location matches the winning image area location;

upon determining that the randomly selected image area location does not match the winning image area location, determining if a subsequent display page will be a random response page or a rules based dynamic response page.

13. A method according to claim 12, further comprising:

providing a set of rules to determine whether a random response page or a rules based dynamic response page will be generated if the randomly selected image area location does not match the winning image area location.

14. The method of claim 12, further comprising:

requesting the user to provide an identifier;

customizing a dynamic response page to the identifier of the user.

15. The method of claim 12, further comprising:

providing the user with a winner's form to fill out and submit upon determining that the image area location matches the winning image area location.

16. The method of claim 12, further comprising:

providing a set of rules to determine whether a random response page or a rules based dynamic response page will be generated if the randomly selected image area location does not match the winning image area location;

generating a dynamic response page customized to the user.

17. The method of claim 12, further comprising:

providing a set of rules to determine whether a random response page or a rules based dynamic response page will be generated if the randomly selected image area location does not match the winning image area location;

generating a dynamic response page customized to a game situation.

\* \* \* \* \*